United States Patent [19]

Grant

[11] 3,821,186

[45] June 28, 1974

[54] POLYMERISATION CATALYST

[75] Inventor: David Grant, Southampton, England

[73] Assignee: The International Synthetic Rubber Company Limited, Southampton, England

[22] Filed: Dec. 15, 1971

[21] Appl. No.: 208,425

[30] Foreign Application Priority Data
Dec. 22, 1970  Great Britain.................... 60835/70

[52] U.S. Cl...... 260/94.9 E, 252/492 C, 260/80.78, 260/88.2 B, 260/93.55, 260/94.3, 260/94.9 B, 260/94.9 CD, 260/94.9 DA
[51] Int. Cl............................ C08f 1/42, C08f 3/06
[58] Field of Search... 260/94.9 CD, 94.9 E, 88.2 B, 260/80.78, 94.9 DA, 94.9 B; 252/429 C

[56] References Cited
UNITED STATES PATENTS

| | | | |
|---|---|---|---|
| 2,968,652 | 1/1961 | Mertes .......................... | 260/94.9 B |
| 3,070,549 | 12/1962 | Ziegler et al.................... | 252/429 C |
| 3,116,274 | 12/1963 | Boehm et al................... | 260/94.9 C |
| 3,156,681 | 11/1964 | Kavesh et al................ | 260/94.9 CD |
| 3,318,861 | 5/1967 | Adema et al................ | 260/94.9 CD |
| 3,594,330 | 7/1971 | Delbouille et al.............. | 260/94.9 B |

*Primary Examiner*—Joseph L. Schofer
*Assistant Examiner*—A. Holler
*Attorney, Agent, or Firm*—Cushman, Darby & Cushman

[57] ABSTRACT

A process for the preparation of a polymerization catalyst, particularly an olefin polymerisation catalyst, comprises the steps of
1. forming a mixture comprising an organo-magnesium compound, an ether and an inert hydrocarbon liquid,
2. removing substantially all the free ether while subjecting the mixture to shear, and
3. including a hydrocarbon-soluble titanium or zirconium compound in the mixture before, during or after step (2).

Preferably a mixture of the organo-magnesium compound is admixed with the hydrocarbon liquid in the presence of a particulate support and this mixture subjected to shear at elevated temperature for a period of hours before cooling. Preferably the titanium or zirconium compound is added after step (2) and the mixture subjected to a prolonged period of further shear at ambient temperature. The whole process is preferably carried out under an inert gas and is useful for the formation of a highly active catalyst, particularly catalysts for the preparation of polyethylene and ethylene-propylene polymers.

28 Claims, No Drawings

POLYMERISATION CATALYST

This invention relates to a process for the preparation of a catalyst active in polymerisation reactions.

It is well known that olefins may be polymerised by means of a catalyst comprising a transition metal compound, commonly a titanium halide, activated by an organo compound of a metal from groups I to III of the Periodic Table, for example, an aluminium alkyl. Similar catalysts wherein the activator is an organo magnesium compound, such as a Grignard reagent, are also known.

We now find that the mode of preparation of a polymerisation catalyst comprising an organo magnesium compound and a hydrocarbon soluble titanium or zirconium compound has a profound effect on the activity of the resultant catalyst.

According to the present invention a process for the preparation of a polymerisation catalyst comprises the steps of:

1. Forming a mixture comprising an organo-magnesium compound, an ether and an inert hydrocarbon liquid,
2. Removing substantially all the free ether whilst subjecting the mixture to shear, and
3. Including a hydrocarbon-soluble titanium or zirconium compound in the mixture before, during or after step (2).

Preferably in step (2) of the process the shearing takes place at elevated temperature.

The organo-magnesium compound which is used in the process of the present invention is preferably a Grignard reagent of formula RMgX where R is a hydrocarbyl group such as an alkyl (including cycloalkyl), aryl, aralkyl, allyl or cyclodiene group, and X is chlorine, bromine or iodine, or a dihydrocarbyl magnesium compound of formula $R_2Mg$ where each R, which may be the same or different, is a hydrocarbyl group such as exemplified above. Grignard reagents of formula RMgX are most preferred. Examples of suitable organo-magnesium compounds are phenyl magnesium bromide, methyl or ethyl magnesium bromide, allyl magnesium bromide, cyclopentadienyl magnesium chloride, ethyl magnesium iodide, t-butyl magnesium chloride, n-propyl magnesium bromide, magnesium diphenyl, and magnesium cyclopentadienide.

Such compounds may be obtained as a solution or dispersion in a hydrocarbon liquid, and provided the hydrocarbon is inert (i.e., does not react with the titanium or zirconium catalyst component), the compounds may be used as such. In one aspect of the invention, however, the organo-magnesium compound is utilised as a mixture (which may be a solution or dispersion) in an ether. In this preferred aspect the mixture of the organo-magnesium compound and the ether is admixed with an inert hydrocarbon liquid and substantially all the free ether is removed whilst subjecting the mixture to shear. The ether may be aliphatic, aromatic, aliphatic-aromatic or cyclic, examples being diethyl ether, tetrahydrofuran, di-n-butyl ether, di-isoamyl ether and anisole. Desirably the ether has a relatively low boiling point, e.g. 30° to 80° C and for this reason diethyl ether or tetrahydrofuran are particularly suitable. Diethyl ether is the most preferred ether.

As mentioned above, substantially all the free ether is removed whilst subjecting the hydrocarbon/organo-magnesium compound mixture to shear. It is important that not all the ether is removed. Whilst we do not wish to be bound by any particular theory we believe that during the shearing step, step (2), some of the ether forms co-ordinate bonds with the organo-magnesium compound and, in the presence of the titanium or zirconium compound, the ether becomes co-ordinated as part of the catalyst. Unco-ordinated (i.e., free) ether lowers the activity of the resultant catalyst and hence is to be avoided. The optimum conditions for removal of the free ether (but not the co-ordinated ether) may have to be established in separate experiments but will generally fall within the conditions described herein.

The hydrocarbon liquid is inert (i.e., does not react with the titanium or zirconium catalyst component) and it may be aliphatic (including cycloaliphatic) for example, hexane, heptane or cyclohexane, or aromatic, such as benzene or tetralin. Aliphatic hydrocarbons are preferred. Preferably the hydrocarbon liquid has a boiling point at least 20° C above the boiling point of the ether.

The mixture of the organo-magnesium compound, hydrocarbon liquid and the ether are subjected to shear by, for example, high speed shear stirring, by ball milling, colloid milling, rod milling, or by passage through the orifice of a homogenising valve at high (e.g. greater than 1,000 psig) pressure. Ball milling, colloid milling or rod milling are preferred since these methods are most readily adapted for removal of the ether while shear is applied. Ball milling using e.g. stainless steel or glass balls, is particularly suitable. The ether may be removed by, for example, passing a dry inert gas such as nitrogen through the vessel containing the mixture, via a reflux head, under reduced pressure or by heating the mixture. Heating the mixture in step (2) of the process is the method particularly preferred.

When the mixture is subjected to shear at elevated temperature, the maximum temperature must be such that the hydrocarbon liquid is not completely removed under the pressure conditions used. Preferably the temperature is in the range 100° to 150° C, more preferably 100° to 120° C. For example, in the case where tetralin (boiling point 207° C) is used as the hydrocarbon liquid and an ether such as diethyl ether (boiling point 35° C) or tetrahydrofuran (boiling point 65° C) is used, the temperature may be raised up to, e.g., 120° C, to remove the free ether provided there is sufficient tetralin present for the tetralin not to be removed completely. Where the boiling points of the ether and hydrocarbon liquid are close (e.g. 20° C difference) additional hydrocarbon liquid may be added to retain the required volume. It is desirable to maintain the mixture of the organo-magnesium compound, hydrocarbon liquid and the ether at elevated temperature for a period of 1 to 2 hours or more, preferably 5 to 6 hours, whilst subjecting the mixture to shear and during this time it is generally found that a colour change occurs. In the case where the organo-magnesium compound is liquid and/or soluble in the hydrocarbon used in step (1), the period during which the mixture is subjected to shear may be considerably reduced to, e.g., a period of minutes.

The hydrocarbon soluble titanium or zirconium compound is preferably a halide such as titanium tetrachloride. Alcoholates are examples of another class of compounds which may be used. Desirably the metal is in its maximum oxidation state. The compound may be admixed directly (e.g. as a particulate solid) with the mixture of hydrocarbon liquid and organo-magnesium compound, but desirably it is admixed as a solution in hydrocarbon liquid, preferably the same hydrocarbon as any already present with the organo-magnesium compound. Desirably the temperature of admixing is less than 60° C, preferably below 30° C, but not so low that the materials crystallise or freeze. The point at which the titanium or zirconium compound is included with the organo-magnesium mixture may be before, during or after subjecting the mixture to shear. It is, however, preferred to include the titanium or zirconium compound after the shearing step (step 2) has been substantially completed. In such cases it is very desirable to subject the catalyst to further shear at ambient temperatures, preferably by ball-milling, for a period of, e.g., 10 to 12 hours or more. Elevated temperatures are not required for the further shear and may indeed be detrimental to the activity of the catalyst.

The molar ratio of organo-magnesium compound to titanium or zirconium compound is generally in the range 10:1 to 1:10, preferably 2:1 to 1:2. Where excess titanium or zirconium compound is used some reduction in catalyst activity (expressed as grams of polymer per gram of titanium or zirconium metal) may be obtained. There is no advantage in using large excesses of organomagnesium compound. In fact, excess organomagnesium compound may have an adverse effect on the catalyst activity and is, in any case, uneconomic.

The catalyst preparation is carried out in the substantial absence of air, oxygen, moisture and other deactivating substances and these are excluded at all times. Conveniently catalyst preparation is carried out under an inert gas, e.g. nitrogen.

The catalyst obtained by the process of the invention is particularly active for the polymerisation and copolymerisation of olefins (including diolefins, cyclo-olefins and activated vinyl compounds, e.g. styrene), either in the gaseous or liquid phase. It is, however, particularly applicable to the polymerisation and copolymerisation of aliphatic mono-olefins such as ethylene and propylene and very active in the homopolymerisation of ethylene.

A process for the polymerisation of one or more olefins, preferably one or more mono-olefins, by means of a catalyst prepared according to the process of invention is included within the scope of the present invention. Polymerisation is usually carried out at a temperature of −20° to 250° C, preferably at 20° C or more, and at a pressure of sub-atmospheric, e.g. 50 mm. to e.g. 100 atmospheres absolute, preferably 1 to 50 atmospheres absolute, and desirably under moisture-free and molecular oxygen-free conditions. Conveniently the catalyst may be employed at atmospheric pressure. The amount of catalyst used is sufficient to obtain polymer and may be as low at $10^{-6}$ moles (based on Ti or Zr) per litre of solvent in the case of liquid phase polymerisations. Varying the amount of catalyst used generally varies the molecular weight of the final polymer, increased amounts generally resulting in a polymer of lower molecular weight. Conveniently the amount of catalyst used is in the range of $1 \times 10^{-6}$ moles to $500 \times 10^{-6}$ moles per litre of solvent. The reaction may, however, be modified by the presence in controlled amounts of compounds such as hydrogen, water or alcohols which are known in the art to reduce the molecular weight of the final product and/or to increase yield. The reaction is particularly readily modified using hydrogen, enabling polymers having a wide variety of molecular weights (as indicated by melt index) to be prepared.

Catalysts prepared according to the process of the present invention are particularly active in polymerisations such as those described above when used with an organo metal compound (b) of a metal from Group IA, IIA, IIB, IIIB, IVB or VB, which compound contains no halogen. Metal hydrocarbyls are preferred. Particularly suitable compounds are organo aluminium compounds of general formula, R'R''R'''Al wherein R', R'' and R''', which may be the same or different, are chosen from hydrogen or a hydrocarbyl radical, e.g. alkyl, aryl, aralkyl, alkenyl, alkynyl, cycloalkyl or cycloalkenyl. Preferred examples of component (b) are aluminium triethyl, aluminium triisobutyl or diisobutyl aluminium hydride. The Lewis acid activity of such compounds may be altered if desired by the addition of a transition metal-free Lewis acid such as aluminium halide. It is desirable to have a molar excess of magnesium organometallic compound and organometallic compound (b) with respect to the hydrocarbon-soluble titanium or zirconium compound and especially desirable to have at least sufficient organometallic compound (b) present to act as a scavenger and remove reactable impurities that may be present in the polymerisation system (e.g. in the monomers and solvents). Amounts of organometallic compound (b) in excess of those required for scavenging act as co-catalyst and such excess amounts are preferably employed. Generally in the case of an organo aluminium compound the concentration is in the range $10^{-3}$ to $5 \times 10^{-3}$ moles (based on AL) per litre of solvent, concentrations of 4 or $5 \times 10^{-3}$ moles per litre resulting in a good rate of reaction. The organometallic compound (b) is conveniently added as a solution in hydrocarbon solvent, particularly the same hydrocarbon solvent as used in the catalyst preparation, e.g. hexane, cyclohexane or tetralin.

Preferably the catalyst is deposited on a particulate support, thus enabling polymerisation using fluid bed conditions to be used if desired. Generally in such cases the support is used in amounts of up to 10 percent by weight of catalyst. Examples of suitable supports are magnesium oxide, silica, calcium carbonate, zinc oxide, potassium hydrogen phosphate and aluminium oxide, silica ($SiO_2$) being particularly effective. Where a particulate support is used it is preferred that this is included in the mixture subjected to shear, preferably at elevated temperature.

By means of polymerisation catalysts prepared according to the present invention, very high yields of polymer may be obtained, only very small amounts thus being present in the polymer product. Since the residual chemical activity of the catalyst is low these small amounts of catalyst may be retained in the final polymer without any deleterious effect, thus rendering lengthy wash or extraction procedures unnecessary.

The olefin polymers obtained from polymerisation catalysts prepared according to the invention may be amorphous or crystalline depending upon the monomer(s) and reaction conditions used. For example, ethylene may be homopolymerised by the catalyst of the present invention to a high yield of high density thermoplastic having excellent impact strength and melt flow properties. They may be employed in any of the applications to which conventional polymers are put. Thus, for example, moulded articles, or sheets, films or fibres composed at least of polymers prepared by means of such catalysts, may be formed. Other ingredients may, of course, also be included, such as fillers, plasticisers, antioxidants and, where appropriate as in EPDM polymers, vulcanisation ingredients. EPDM polymers are amorphous rubbery copolymers generally containing from 20 percent to 80 percent molar, commonly 40 percent to 70 percent molar, of ethylene and up to 10 percent or more molar of an unsaturated third monomer, such as dicyclopentadiene, 1,4-hexadiene, or 5-ethylidene norbornene, the balance being one or more alpha olefins, usually propylene. The unsaturated third monomers are well known in the art and they confer residual unsaturation on the final polymer so that it can be cured using the usual sulphur-containing recipes. In the absence of residual unsaturation curing may be obtained using, for example, a peroxide such as dicumyl peroxide.

We have found that catalysts prepared according to the invention are considerably more active than those prepared hitherto as shown by the very high yields of polymer obtainable, measured in terms of grams of polymer obtained per gram of titanium (or zirconium) metal bound in the catalyst (e.g. $10^4$ to $10^6$ g/g). The combination of subjecting the mixture to shear whilst removing the free ether results in a very effective use of the titanium or zirconium compound when the catalyst is formed. Further, in the preferred process where the shear at step (2) is carried out at elevated temperature, e.g. 100° to 120° C, the titanium or zirconium compound is added after cooling the mixture and the catalyst is subjected to a further prolonged period of shear. It appears that the catalyst dispersion is reduced to a colloidal level and the ether becomes more intimately bound (or co-ordinated) with the catalyst components.

Furthermore, the catalysts prepared according to the invention retain their activity for a prolonged period of time and thus may be stored for e.g. 10 months or more.

Some preferred embodiments in accordance with the present invention will now be described by way of example.

EXAMPLE 1

A stainless steel ball mill of 1 litre nominal capacity was charged one-third full with stainless steel balls of ¼–1 inch diameter. The mill and contents were heated for several hours at 110° C whilst being flushed dry with nitrogen, then cooled.

The mill was charged with dry oxygen-free tetralin (150 ml.) and run with a nitrogen flush for a period of ambient temperature. A 1.25M solution of phenyl magnesium bromide in diethyl ether (50 ml.) was added with milling resumed. The mill was slowly heated to 110° C over a period of 5 hours still with the nitrogen flush, at the end of which time the free ether had been removed. It was found that a colour change from white to yellow had occurred. Much of the tetralin had also been removed and the liquid content of the mill was of the consistency of thin paste. Milling was continued for a further 1½ hours at 110° C, then the mill was allowed to cool to room temperature, about 25° C.

A 1.6M solution of $TiCl_4$ in hexane (38.5 ml.) was added and milling resumed under nitrogen for a further 4½ hours at room temperature. Dry oxygen-free hexane (100 ml.) was added, the mill operated for a few minutes then the contents transferred to a glass container for testing.

The titanium content of the final dispersion was 0.36M. The catalyst was tested for activity in the polymerisation of ethylene as follows: A steel reactor of 1 gallon nominal capacity was charged with 3 litres of hexane. Stirring was commenced and the reactor flushed by alternately pressurising and venting four times with nitrogen then four times with hydrogen. Tri-isobutyl aluminium (7.5 m.mol.) was added followed by a quantity of catalyst dispersion containing 0.02 m.moles Ti. The reactor was pressurised to 70 psig with hydrogen, then to 150 psig with ethylene. Polymer of melt index 2.1 was produced in an amount corresponding to a rate of 80 Kg/g. catalyst hour.

In the absence of hydrogen the polymerisation rate corresponded to 900 Kg/g. catalyst/hour, but the product had an immeasurably low melt index.

EXAMPLES 2–5

These examples show polymerisation using a preferred method of preparing a catalyst according to the present invention. In this preferred method a support (in this case silica) is used admixed with the inert hydrocarbon liquid (in this case hexane). A Grignard reagent in ether is added and the mixture subjected to shear at elevated temperature. After cooling titanium tetrachloride is added and the catalyst mixture subjected to prolonged shear at ambient temperature.

6 g. amorphous silica (Monsanto, Santocel FRC) was heated in a Pyrex glass test tube to 500°–600° C for 15 mins. under nitrogen and was then transferred to an oven-dried, nitrogen-cooled, stainless steel ball mill and 100 mls. hexane was added. Milling was carried out for 3 hours and then for a further 2¾ hours. 100 mls. 1.96M PhMgBr in diethyl ether was then added and milling whilst heating to 120° C and purging with nitrogen carried out for 2 hours. The ball mill was then allowed to cool down while slowly rotating (for about 2 hours). 40 cm³ (40 mls) hexane was added, milling being carried out for about 25 mins and then a further 40 cm³ hexane was added (to adjust the consistency of the mixture). 121 cm³ 1.62M $TiCl_4$ in hexane was added and milling carried out for about 6 hours, continuing the nitrogen purge. Fumes were observed to emit from the ball mill for the first 1¼ hours at this stage. Further milling was carried out for about 5½ hours then 150 cm³ hexane was added and operations of the mill continued for a further 10 mins. By use of a syringe, 30 cm³ of the dispersion was transferred for use separately to a crown capped bottle, which was purged with $N_2$. A further 200 cm³ hexane was added to the ball mill which was rolled for a few minutes, then poured directly into another crown capped bottle (without special precaution being taken to exclude atmospheric contamination at this stage). The titanium concentration was 0.38Molar.

Analysis of the concentrated 0.38M catalyst dispersion for diethyl ether was carried out. 0.1 percent $Et_2O$ (with respect to hexane) was found in the hexane layer and 3.0 percent in the hydrolysed total dispersion (i.e. after decomposition of the catalyst). Analysis for magnesium was also carried out. The $Et_2O$:Mg ratio was found to be 1:2.5. This suggests that the stoichiometry of the catalyst dispersion may be expressed as $TiCl_4 \cdot PhMgBr(Et_2O)_{0.40}$ A portion of the catalyst dispersion was diluted to a concentration of 0.0122 Molar of titanium and tested for catalyst activity as in Example 1 with the exception of the items shown in the table.

| Ex. No. | Vol. of 0.0122M catalyst | Hydrogen pressure (psig) | Reaction time (mins) | Yield (g) | Melt Flow Index (2.16 Kg at 190°C) | Yield g/polymer per g. Ti/hour |
|---|---|---|---|---|---|---|
| 2 | 1 ml. | trace | 12 | 167 | 0.01 | $1.44 \times 10^6$ |
| 3 | 1 ml. | 75 | 12 | 50 | 0.72 | $4.3 \times 10^5$ |
| 4 | 2 ml. | 75 | 60 | 251 | 2.1 | $2.2 \times 10^5$ |
| 5 | 2 ml. | 0 | 41 | 329 | 0.014 | $4.1 \times 10^5$ |

Properties of polyethylenes prepared under various polymerisation conditions using the catalyst described in Example 2 generally are as follows:

| | |
|---|---|
| Density*: | 0.956 to 0.965 |
| *after annealing for ¼ hour at 185°C and cooling. | |
| Vicat Softening Point: | 126–131°C |
| Tensile Strength**: | 3300–3850 psi |
| **crosshead speed 0.5 cm/min. | |
| Hardness (D scale): | 64–68 |
| Notched Impact Strength | |
| (A) at melt flow index 0.15 g/10 min. 190°C | |
| (1) ¼″ Bars (ft.lbs/in) | 12 |
| (2) ⅛″ Bars | 24 |
| (B) at melt flow index 11.35 g/10 min. 190°C | |
| (1) ¼″ Bars (ft.lbs/in) | 0.73 |
| (2) ⅛″ Bars | 0.77 |
| Weight Av. M.Wt. (Mw) | $7 \times 10^4 - 2.2 \times 10^5$ |

In the following Examples various different supports were used and slightly varied procedures.

EXAMPLE 6

10.7 g. of heavy magnesium oxide (MgO) was heated for 6 hours at 600° C and for further 9 hours at 430° C, then 2.7 hours at about 500° C. On cooling 50 ml. hexane was added and ball milling in a glass ball mill using 10 mm. glass balls conducted for a few minutes. 16 cm³ 0.5M PhMgBr in diethyl ether was then added and milling carried out for 2 hours. The free ether was distilled off at atmospheric pressure whilst milling, then 16 cm³ 0.51M TiCl₄ solution in hexane was added. Immediately a reddish colour was formed. Milling was conducted for 8 hours thereafter for a further 5 milling periods of 7–8 hours each (in total 38 hours milling after adding the ingredients to the ball mill). The catalyst dispersion was then transferred in a dry-box to a half pint crown capped bottle containing 18 cm³ hexane. It consisted of a brownish red suspension which settled out on standing.

Polymerisation of purified ethylene using this catalyst was conducted using the general procedure described in Example 1 under the following conditions:

| | |
|---|---|
| Solvent: | hexane — 3 litres |
| Triisobutyl aluminium: | 5 cm³ of 1.5M solution in hexane |
| Catalyst: | 1 cm³ of 0.05M Ti dispersion in hexane |
| Ethylene pressure: | 150 psig |
| Hydrogen pressure: 75 psig (initially) | |
| Initial temperature: | 60°C |
| Reaction time: | 60 minutes |

The results are given in the table below.

EXAMPLE 7

10 g. MgO was taken and 3 hours roasting at 600° C carried out whilst ball milling in a glass mill, then cooled under nitrogen, 40 cm³ hexane was added, milling continued for 1½ hours, then 16 cm³ PhMgBr (0.5M soln. in diethyl ether) was added and distillation of ether carried out for ½ hour. 16 cm³ 0.51M TiCl₄ soln. in hexane was added, producing a reddish colour. After milling for 1 hour the colour became brown. Milling was continued for a further 6 hours.

The dispersion was transferred to a ½ pint crown capped bottle in a dry-box and polymerised as in Example 6. The results are given in the table below.

EXAMPLE 8

10 g. CoCO₃ of high surface area was heated whilst milling in a glass mill at 750° C for 6 hours followed by about 8 hours at 600° C (in the latter case whilst passing a dry, deoxygenated nitrogen stream through the mill). This was followed by a further 4 hours of heating at 600° C. 20 cm³ hexane was added and milling continued for 1¾ hours, then 20 cm³ hexane was added and milling continued for about 4 hours. Then 16 cm³ PhMgBr 0.5M solution in diethyl ether soln. was added, producing a greenish colour. Milling was continued for about 4 hours, then the ether was distilled off after which 23.5 cm³ 0.35M TiCl₄ was added. The colour initially became red-orange and later brown, on milling. Milling was continued for about 8 hours to give a dark reddish supernatant liquid and a dark brownish solid. This was tested for polymerisation activity as before.

EXAMPLE 9

10 g. MgO, as in Example 6, was roasted while milling in a glass mill for 2 hours at 700° C, then for 4 hours at 600° C. The oxide was cooled to room temperature whilst milling for 1 hour using dry N₂, hexane (40 ml) added, and milled for a further 1 hour. 15 cm³ PhMgBr 0.5M in diethyl ether solution was added then the mixture was milled for 2 hours. Distillation of ether whilst milling for 1½ hours was carried out. Thereafter 16 cm³ TiCl₄ (0.5M in hexane solution) was added. A red colour formed immediately on addition of TiCl₄ solution. Variations in colour were observed, some areas being green. After further 2 hours milling a sample of the supernatant liquid was removed, which contained 10 mg. solids/cm³. This was tested for polymerisation activity, as before.

EXAMPLE 10

A steel ball mill containing half the volume of stainless steel balls of diameter 1 inch, 1½ inches and ¼ inch was charged with 200 cm³ of tetralin, sealed and milled whilst blowing through nitrogen, and then heated to about 100° C for about 1 hour and allowed to cool whilst continuing the nitrogen flush. 0.101 moles of a solution of PhMgBr (0.5M in diethyl ether) was added and milling continued whilst gently warming for 2 hours (still with the nitrogen flush). Finally, steam was passed through until no further free ether was detected. Thereafter $TiCl_4$ 0.5M in hexane solution was added to give a Ti:Mg ratio of 1:1. The resultant catalyst was tested for polymerisation activity, as before.

EXAMPLE 11

Example 10 was repeated except that $Al_2O_3$ was substituted for the ZnO.

| Ex. No. | Support | Yield g/g Ti, hour | Melt Flow Index (2.16 Kg at 190°C) |
|---|---|---|---|
| 6 | MgO | $1.9 \times 10^5$ | 0 |
| 7 | MgO | $4.4 \times 10^4$ | 0 |
| 8 | $CaCO_3$ | $3.4 \times 10^4$ | 2.5 |
| 9 | MgO | $3.3 \times 10^4$ | 3.2 |
| 10 | ZnO | $1.4 \times 10^5$ | 3.3 |
| 11 | $\gamma Al_2O_3$ | $2.9 \times 10^4$ | 0.5 |

If ball milling times are increased in the above examples there is generally an increase in melt flow index and/or yield.

In addition to the above Examples, potassium hydrogen phosphate, lanthanum oxychloride and magnesium hydroxide were also found to be effective supports although in some cases yields were reduced to about $10^3$ g. of polymer/g. of Ti/hr.

Addition of small amounts of diethyl ether to the catalyst prior to polymerisation was investigated and it was found that at a Ti:ether mole ratio of about 1:0.25 the yield of polymer was practically halved. This shows that free either is detrimental to the catalyst activity (in common with other co-ordination catalysts).

EXAMPLES 12–16

In these Examples various different Grignard reagents were used as the organo magnesium component.

In each case the procedure used was as follows: A solution (or dispersion as the case may be) of the Grignard reagent in ether was heated to 100° C under vacuum (0.1 mm) for 2 hours whilst subjecting to shear to remove the free ether. Sufficient hexane was added during this time to keep the solid dispersed. The mixture was then cooled whilst ball milling for a period of 12 hours, this ball milling being carried out in a glass bottle with glass balls of 8–10 mm. diameter. $TiCl_4$ was added (Ti: Grignard mole ratio 1:1) and shear continued for a further 12 hours.

The resultant dispersion was tested for polymerisation of ethylene using the conditions described in Example 6, except that the volume of catalyst dispersion varied slightly.

Results are quoted in the table.

EXAMPLE 17

The catalyst described in Example 10 $PhMgBr/TiCl_4$ + ZnO support in tetralin has been found to be particularly effective for the preparation of ethylene propylene copolymers.

When propylene is present in low proportions (e.g. 1 to 10 percent molar of the monomer concentration) a product which is translucent, of high strength and flexible is obtained.

e.g. Polymerisations in Example 6 except using 0.01 mmole Ti, 3 mmole $Et_3Al$, 80 psi monomer pressure, no hydrogen gave:

| % $C_3H_7$ | Yield | Melt Index (21.6 Kg) | Density | Tensile Strength (psi) |
|---|---|---|---|---|
| 4 | 175 | 0.81 | 0.915 | — |
| 10 | 220 | 1.02 | 0.905 | 3,400 |

With larger amounts of propylene, e.g. E:P ratio 70:30, EP and EPT rubbers may be produced at high yield (e.g. $3.5 \times 10^4$ g/Ti/hour) requiring no catalyst removal for commercial application.

What we claim is:

1. A process for the preparation of a polymerisation catalyst comprising the steps of:
   1. forming a mixture comprising an organomagnesium compound, an ether and an inert hydrocarbon liquid
   2. removing substantially all the free ether whilst subjecting the mixture to shear under conditions such that some of the ether is retained co-ordinated with the organomagnesium compound, and
   3. including a hydrocarbon-soluble titanium or zirconium compound in the mixture before, during or after step (2).

2. A process according to claim 1 wherein step (1) of the process comprises admixing a mixture of an organo-magnesium compound and an ether with an inert hydrocarbon liquid.

3. A process according to claim 1 wherein the temperature is 100° to 150° C. in step (2).

4. A process according to claim 1 wherein the temperature is 100° to 120° C.

5. A process according to claim 1 wherein the hydrocarbon-soluble titanium or zirconium compound is included in the mixture after step (2) of the process at a temperature of less than 60° C and the catalyst is thereafter subjected to further shear below that temperature.

6. A process according to claim 5 wherein the catalyst is subjected to the further shear below 60° C for a period of at least 10 hours.

7. A process according to claim 1 wherein the hydrocarbon/organo-magnesium compound/ether mixture is subjected to shear in step (2) of the process in the presence of a particulate support.

| Ex. No. | Grignard Reagent | mmoles Ti used | Yield | Melt Index 2.16 Kg 190°C |
|---|---|---|---|---|
| 12 | $CH_3MgBr$ | 0.044 | $1.075 \times 10^5$ | 3.02 |
| 13 | Allyl MgBr | 0.046 | $6.95 \times 10^4$ | 1.82 |
| 14 | tBuMgCl | 0.044 | $5 \times 10^4$ | 0.8 |
| 15 | do. | 0.028* | $8 \times 10^4$ | 0.6 |
| 16 | nPrMgBr | 0.047 | $3.9 \times 10^4$ | 2.0 |

* In this case $TiCl_4$ was added to the Grignard at the beginning.

8. A process according to claim 1 wherein, in step (1) of the process, a mixture of the inert hydrocarbon liquid and an organo metal compound of a metal from Group IA, IIA, IIB, IIIB, IVB or VB which compound contains no halogen, is formed and the organo-magnesium compound and ether mixture is added.

9. A process according to claim 1 wherein the organo-magnesium compound is selected from a Grignard reagent of formula RMgX or a dihydrocarbyl magnesium compound of formula $R_2Mg$, where R is hydrocarbyl and X is chlorine bromine or iodine.

10. A process according to claim 1 wherein the organo-magnesium compound is selected from phenyl magnesium bromide, methyl magnesium bromide, ethyl magnesium bromide, allyl magnesium bromide, cyclopentadienyl magnesium chloride, ethyl magnesium iodide, t-butyl magnesium chloride and n-propyl magnesium bromide.

11. A process according to claim 1 wherein the ether is diethyl ether or tetrahydrofuran.

12. A process according to claim 1 wherein the hydrocarbon liquid is aliphatic.

13. A process according to claim 1 wherein step (2) of the process is carried out under reduced pressure.

14. A process according to claim 1 wherein titanium tetrachloride is the compound used in step (3).

15. A process according to claim 1 wherein the mole ratio of organo-magnesium compound to titanium or zirconium compound is 10:1 to 1:10.

16. A process according to claim 15 wherein the mole ratio is 2:1 to 1:2.

17. A process according to claim 1 carried out substantially totally under an inert gas.

18. A process for the preparation of a polymerisation catalyst comprising:
 1. admixing a support with an inert hydrocarbon liquid and thereafter a Grignard reagent of formula RMgX in an ether,
 2. subjecting the mixture to shear at a temperature of 100° to 150° C whilst removing substantially all the free ether under conditions such that some of the ether is retained coordinated with the Grignard reagent,
 3. cooling the mixture to below 30° C and admixing titanium tetrachloride, and
 4. subjecting the mixture containing the titanium tetrachloride to a further period of shear of at least 10 hours, the process being carried out under an inert gas.

19. A catalyst when prepared by a process according to claim 15.

20. A catalyst when prepared by a process according to claim 18 wherein the mole ratio of organo-magnesium compound to titanium compound is 10:1 to 1:10.

21. A process for the polymerisation of one or more olefins by means of a catalyst according to claim 19 together with an organic compound of the general formula $R'R''R'''Al$ wherein $R'$, $R''$ and $R'''$ are hydrogen or a hydrocarbyl radical.

22. A process according to claim 21 wherein the olefin is ethylene.

23. A process for the polymerisation of one or more olefins by means of a catalyst according to claim 20 together with an organic compound of the general formula $R'R''R'''Al$ wherein $R'$, $R''$ and $R'''$ are hydrogen or a hydrocarbyl radical.

24. A process according to claim 23 wherein the olefin is ethylene.

25. A catalyst having the formula $TiCl_4PhMgBr(Et_2O)_{0.40}$ where Ph is the phenyl group and Et is the ethyl group prepared by the process of claim 18.

26. A process for the polymerisation of at least one olefin by means of a catalyst according to claim 25.

27. A process according to claim 5 wherein the shearing step is carried out by shearing in a ball mill.

28. A process according to claim 1 wherein, in step (2) the period of shear is 1 to 6 hours.

* * * * *